United States Patent
Kuo et al.

(10) Patent No.: US 11,714,707 B2
(45) Date of Patent: Aug. 1, 2023

(54) DDR5 CROSSTALK MITIGATION THROUGH AGRESSOR MISALIGNMENT

(71) Applicant: DELL PRODUCTS, LP, Round Rock, TX (US)

(72) Inventors: Wan-Ju Kuo, Xindian District (TW); Douglas Winterberg, Austin, TX (US); Bhyrav Mutnury, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 61 days.

(21) Appl. No.: 17/231,396

(22) Filed: Apr. 15, 2021

(65) Prior Publication Data

US 2022/0334919 A1  Oct. 20, 2022

(51) Int. Cl.
| | |
|---|---|
| *G11C 29/00* | (2006.01) |
| *G06F 11/10* | (2006.01) |
| *G06F 11/07* | (2006.01) |
| *G06F 13/16* | (2006.01) |
| *G06F 11/30* | (2006.01) |
| *G06F 11/34* | (2006.01) |

(52) U.S. Cl.
CPC ........ *G06F 11/1068* (2013.01); *G06F 11/076* (2013.01); *G06F 11/0772* (2013.01); *G06F 11/3037* (2013.01); *G06F 11/3466* (2013.01); *G06F 13/1689* (2013.01)

(58) Field of Classification Search
CPC .............. G06F 11/1068; G06F 11/076; G06F 11/3037; G06F 11/3466; G06F 11/0772; G06F 13/1689
See application file for complete search history.

(56) References Cited

U.S. PATENT DOCUMENTS

| | | | |
|---|---|---|---|
| 10,176,858 B1 | 1/2019 | Wilmoth et al. | |
| 10,460,791 B2 | 10/2019 | Ho | |
| 2008/0140907 A1* | 6/2008 | Dreps | G06F 13/1694 711/E12.001 |
| 2008/0189455 A1* | 8/2008 | Dreps | G06F 13/1694 710/106 |
| 2010/0005345 A1* | 1/2010 | Ferraiolo | G11C 29/022 714/E11.006 |
| 2014/0129869 A1* | 5/2014 | Johnson | G11C 7/1066 713/503 |
| 2020/0313722 A1* | 10/2020 | McCall | H04B 3/487 |

* cited by examiner

*Primary Examiner* — Samir W Rizk
(74) *Attorney, Agent, or Firm* — Larson Newman, LLP

(57) ABSTRACT

An information handling system includes a dual in-line memory module (DIMM) and a memory controller coupled to the DIMM via a data bus. The memory controller determines that a first lane of a byte group of the data bus is more susceptible to crosstalk than a second lane of the byte group, determines a first performance level of the first lane, changes a delay (D) of a third lane of the byte group, the third lane being adjacent to the first lane, and determines that a second performance level of the first lane is different from the first performance level in response to delaying the third lane.

18 Claims, 3 Drawing Sheets

DDR5 CROSSTALK MITIGATION THROUGH AGRESSOR MISALIGNMENT

FIELD OF THE DISCLOSURE

This disclosure generally relates to memory subsystems in an information handling systems, and more particularly relates to crosstalk mitigation in a Double Data Rate-5 (DDR5) memory sub system.

BACKGROUND

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements may vary between different applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, reservations, enterprise data storage, or global communications. In addition, information handling systems may include a variety of hardware and software resources that may be configured to process, store, and communicate information and may include one or more computer systems, data storage systems, and networking systems.

SUMMARY

An information handling system may include a dual in-line memory module (DIMM) and a memory controller coupled to the DIMM via a data bus. The memory controller may determine that a first lane of a byte group of the data bus is more susceptible to crosstalk than a second lane of the byte group, determine a first performance level of the first lane, change a delay (D) of a third lane of the byte group, the third lane being adjacent to the first lane, and determine that a second performance level of the first lane is different from the first performance level in response to delaying the third lane.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF DRAWINGS

The following description in combination with the Figures is provided to assist in understanding the teachings disclosed herein. The following discussion will focus on specific implementations and embodiments of the teachings. This focus is provided to assist in describing the teachings, and should not be interpreted as a limitation on the scope or applicability of the teachings. However, other teachings can certainly be used in this application. The teachings can also be used in other applications, and with several different types of architectures, such as distributed computing architectures, client/server architectures, or middleware server architectures and associated resources.

Figure 1:
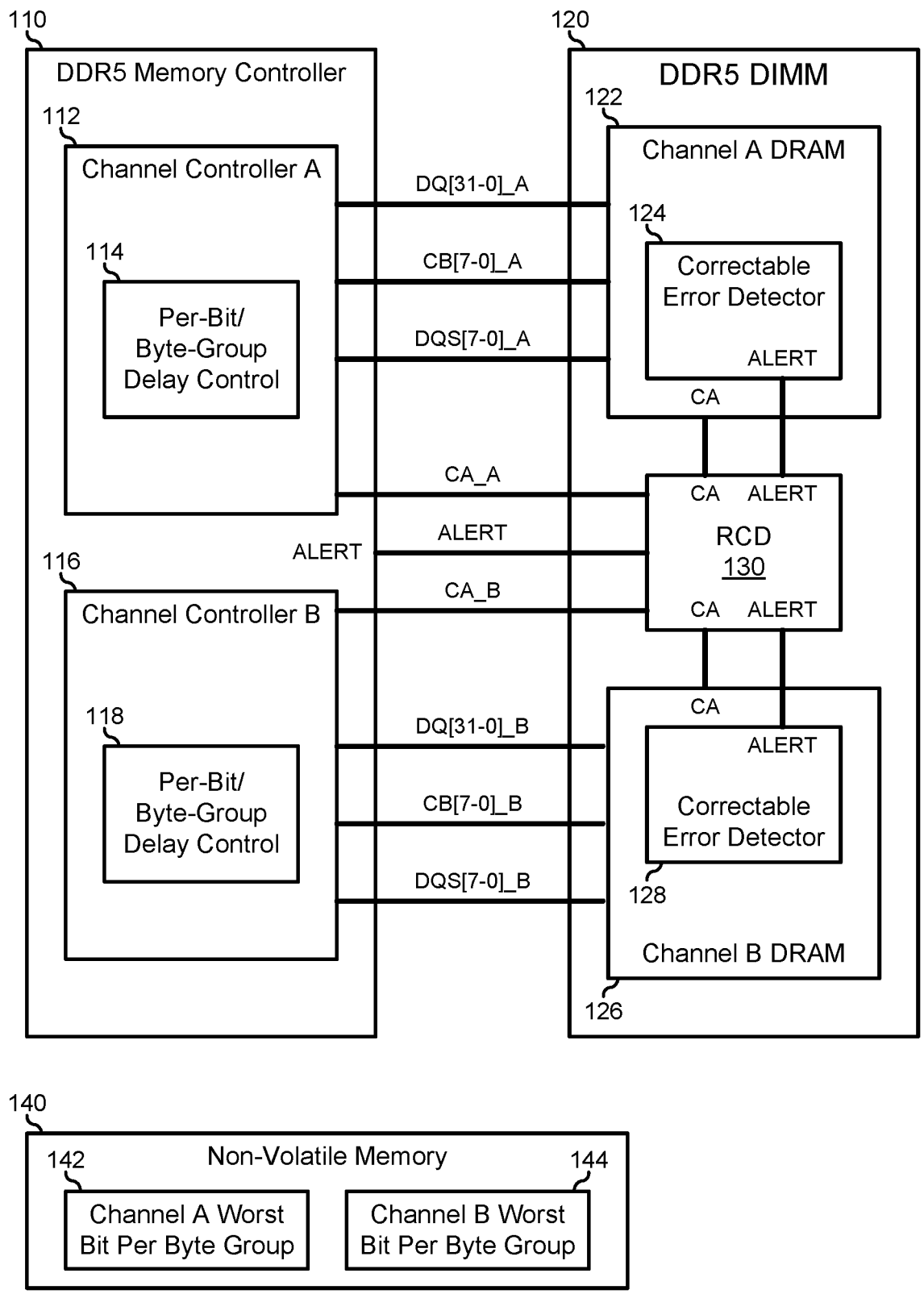
FIG. 1 is a block diagram illustrating a memory subsystem of an information handling system according to an embodiment of the current disclosure.

FIG. 1 illustrates a memory subsystem 100 of an information handling system, including a fifth generation Double Data Rate (DDR5) memory controller 110, a DDR5 dual in-line memory module (DIMM) 120, and a non-volatile memory device 140. Memory subsystem 100 represents a system main memory for the information handling system. Here, the information handling system may be understood to include one or more additional memory subsystems similar to memory subsystem 100, as needed or desired. For example, the information handling system may include one or more processors that each include a memory subsystem similar to memory subsystem 100. Memory subsystem 100 may be further understood to include one or more additional DIMMs similar to DIMM 120 as needed or desired. Memory subsystem 100 will be understood to be provided in accordance with one or more technical specification defining signal characteristics, physical layout, timings, and the like, including the JEDEC JESD79-5 DDR5 SDRAM standard.

The DDR5 memory architecture will be understood to split the single 64-bit data channel (DQ[61-0]) of previous DDR generations into two separate 32-bit data channels (DQ[31-0]_A and DQ[31-0]_B). Each channel will be understood to include its own data strobe signals (DQS[7-0]_A or DQS[7-0]_B), error correction code (ECC) signals (CB[7-0]_A or CB[7-0]_B), and command/address signals (CA_A or CA_B). The DDR5 memory architecture will be further understood to include various per-DIMM signals, such as CLOCK signals, RESET signals, ALERT signals, I3C interface signals, power inputs, and the like. The design and operation of memory subsystems is known in the art and will not be further described herein except as needed to illustrate the current embodiments.

DDR5 memory controller 110 includes two channel controllers, channel controller-A 112 and channel controller-B 116. DDR5 DIMM 120 includes two memory arrays including memory storage devices such as dynamic random access memory (DRAM) devices, non-volatile memory (NVRAM) devices, or other types of storage devices as needed or desired. Here, the memory arrays are depicted as channel-A DRAM array 122 and channel-DRAM array 126. Hereinafter, channel controller-A 112 will be referred to as controller-A 112, channel controller-B 116 will be referred to as controller-B 116, and, when used collectively, will be referred to as controllers 112 and 116. Further, channel-A DRAM array 122 will be referred to as DRAM-A 112, channel-B DRAM array 126 will be referred to as DRAM-B 126, and when used collectively, will be referred to as DRAMs 122 and 126.

DDR5 DIMM 120 further includes a registering clock driver 130. Controller-A 112 provides the data signals (DQ

[31-0]_A), the ECC signals (CB[7-0]_A) and data strobe signals (DQS[7-0]_A) directly to DRAM-A 122, and provides the command/address signals (CA_A) to RCD 130, and the RCD provides the command/address signals (CA_A) to the DRAM_A. Similarly, controller-A 116 provides the data signals (DQ[31-0]_B), the ECC signals (CB [7-0]_B) and data strobe signals (DQS[7-0]_B) directly to DRAM-A 126, and provides the command/address signals (CA_B) to RCD 130, and the RCD provides the command/address signals (CA_B) to the DRAM_B. DRAM_A 122 includes a correctable error detector 124 that operates to detect correctable errors in the data received from controller-A 112 and in the data provided to the controller-A.

When an error that is correctable based upon a particular ECC scheme implemented by memory subsystem 100 is detected by correctable error detector 124, the correctable error detector provides an ALERT signal to RCD 130, and the RCD forwards the ALERT signal to DDR5 memory controller 110. Similarly, DRAM_B 162 includes a correctable error detector 128 that operates to detect correctable errors in the data received from controller-B 116 and in the data provided to the controller-B. When an error that is correctable is detected by correctable error detector 128, the correctable error detector provides an ALERT signal to RCD 130, and the RCD forwards the ALERT signal to DDR5 memory controller 110.

It should be understood that correctable error detectors 124 and 128 may further operate to detect uncorrectable errors as needed or desired, and to provide the ALERT signals in response to detecting the uncorrectable errors. Further, correctable error detectors 124 and 128 may operate to detect additional error conditions, such as voltage anomalies, temperature excursions, or other error conditions, and to provide the ALERT signals in response to such additional error conditions, as needed or desired. The details of error detection and correction, and of error condition reporting in a DDR5 DIMM are known in the art and will not be further described herein except as needed to illustrate the current embodiments.

As DDR5 memory data rates increase, with data rates projected to hit 6.4 to 8 gigabits per second (Gbps), signal integrity issues, such as reflections at discontinuities in the signal path between the memory controller and the memory devices, insertion loss, crosstalk, and the like, are becoming more severe limiting factors in the reliable transmission of data. As a result, the DDR5 memory architecture is increasingly incorporating equalization approaches like decision feedback equalization (DFE) that are common in serial communication architectures such as PCIe, SATA, and the like. However, the inventors of the present disclosure have understood that, problems with crosstalk between data lanes remains an unresolved issue. In particular, because DDR5 data is carried via single-ended multi-drop data lanes, DDR5 memory architectures are more susceptible to crosstalk than are differential-signal architectures. Moreover, crosstalk is highly unpredictable because the signal interference injected into a particular data lane is dependent upon the data carried on nearby data lanes.

Typical approaches to mitigate crosstalk may include quantifying worst case aggressors and spacing signals further apart within target design constraints. However, due to routing density and layout constraints, the ability to separate data lanes is limited, and crosstalk may still be injected into a victim data lane by device packaging, ball grid array (BGA) vias and connectors, and DIMM packaging, which are typically beyond the control of information handling system manufacturers. Further complicating matters, crosstalk injected into a victim data lane may include in-phase crosstalk where signal edges are aligned, such as between the data lanes, and out-of-phase crosstalk where signal edges are not aligned, such as between data lanes and command/address lanes, CLOCK signals, ALERT signals, and the like. Table 1 provides a comparison of eye heights and eye widths for out-of-phase crosstalk with the eye heights and eye widths for in-phase crosstalk in a typical DDR5 memory subsystem.

TABLE 1

Eye Height and Eye Width Comparison for Out-Of-Phase and In-Phase Crosstalk

| | Out-Of-Phase | | In-Phase | | % Difference | |
|---|---|---|---|---|---|---|
| 4.440 GT/s | Eye Height | Eye Width | Eye Height | Eye Width | Eye Height | Eye Width |
| LN1 | 18.2 | 13.0 | 22.4 | 17.1 | 23.4 | 31.7 |
| LN4 | 24.8 | 21.0 | 30.6 | 23.3 | 23.5 | 11.1 |
| LN5 | 29.6 | 18.3 | 35.5 | 21.1 | 20.0 | 15.3 |
| LN6 | 28.7 | 17.8 | 39.6 | 25.9 | 38.1 | 45.8 |

Controller-A 112 includes a delay controller 114 that operates to provide for a delay between a CLOCK signal and the data strobe signals (DQS[7-0]_A), and for a delay between the data strobe signals (DQS[7-0]_A) and the data signals (DQ[31-0]_A and CB[7-0]_A). Similarly, Controller-A 116 includes a delay controller 118 that operates to provide for a delay between a clock signal and the data strobe signals (DQS[7-0]_B), and for a delay between the data strobe signals (DQS[7-0]_B) and the data signals (DQ[31-0]_B and CB[7-0]_B). In a typical usage of delay controller 114 and 118, when memory subsystem 100 is designed, various tests can be performed to characterize the design by placing instrumented interface connectors at the DIMM connectors to determine the delays between the CLOCK signal, the data strobe signals (DQS) and the data signals (DQ) that are inherent in the design of the memory subsystem. Here, in the design phase, the detected delays can be compensated for by introducing delays into the various signals, such that all of the signals reach the DIMM connector simultaneously. The delay values, typically in picoseconds (ps) are then stored to a non-volatile memory, such as non-volatile memory device 140, as default values that can be programmed for each signal during a runtime initialization of the memory subsystem. The details of design validation and testing are known in the art and will not be further disclosed herein except as needed to illustrate the current embodiments.

Then, during a manufacturing process for the information handling systems manufactured in accordance with the particular design, the tests can be performed on each individual information handling system to confirm or modify the pre-programmed values, and any variances between the manufactured information handling systems and the design values can be stored to the non-volatile memory on a per-information-handling-system basis. In this way, any variances between the individual information handling systems is compensated for, such that all of the signals reach the DIMM connector simultaneously. The details of manufacturing validation and testing are known in the art and will not be further disclosed herein except as needed to illustrate the current embodiments.

Finally, when the information handling systems are assembled into a final product, DIMMs will be installed into the DIMM connectors. Here, when the information handling system is powered on, memory subsystem 100 will undergo an initialization process, such as by executing memory reference code (MRC), to set up the memory subsystem and to ensure optimal performance. The initialization may include command/address (CA) write training, data strobe (DQS) and data (DQ) leveling, data strobe (DQS) and data (DQ) read and write training, reference voltage (Vref) training, and the like. Here, the initialization process may operate to modify the delays as needed or desired to ensure optimal performance. The details of memory subsystem initialization and MRC execution are known in the art and will not be further discussed herein except as needed to illustrate the current embodiments.

In a particular embodiment, a ranking of the data lanes is made that indicates a susceptibility to crosstalk. For example, during a design characterization or a manufacturing testing, as described above, the ranking of the worst case data lanes can be determined. In a particular case, the ranking is made per byte group. For example, considering controller-A 112, a ranking of the worst case lanes can be determined for each of DQ[31-24]_A, DQ[23-16], DQ[15-8]_A, DQ[7-0]_A, CB[7-0]_A, and DQS[7-0]_A. The ranking information is stored in non-volatile memory device 140 as channel-A worst bit per byte group information 142, and the similar information for channel-B is stored as channel-B worst bit per byte group information 144.

Figure 2:
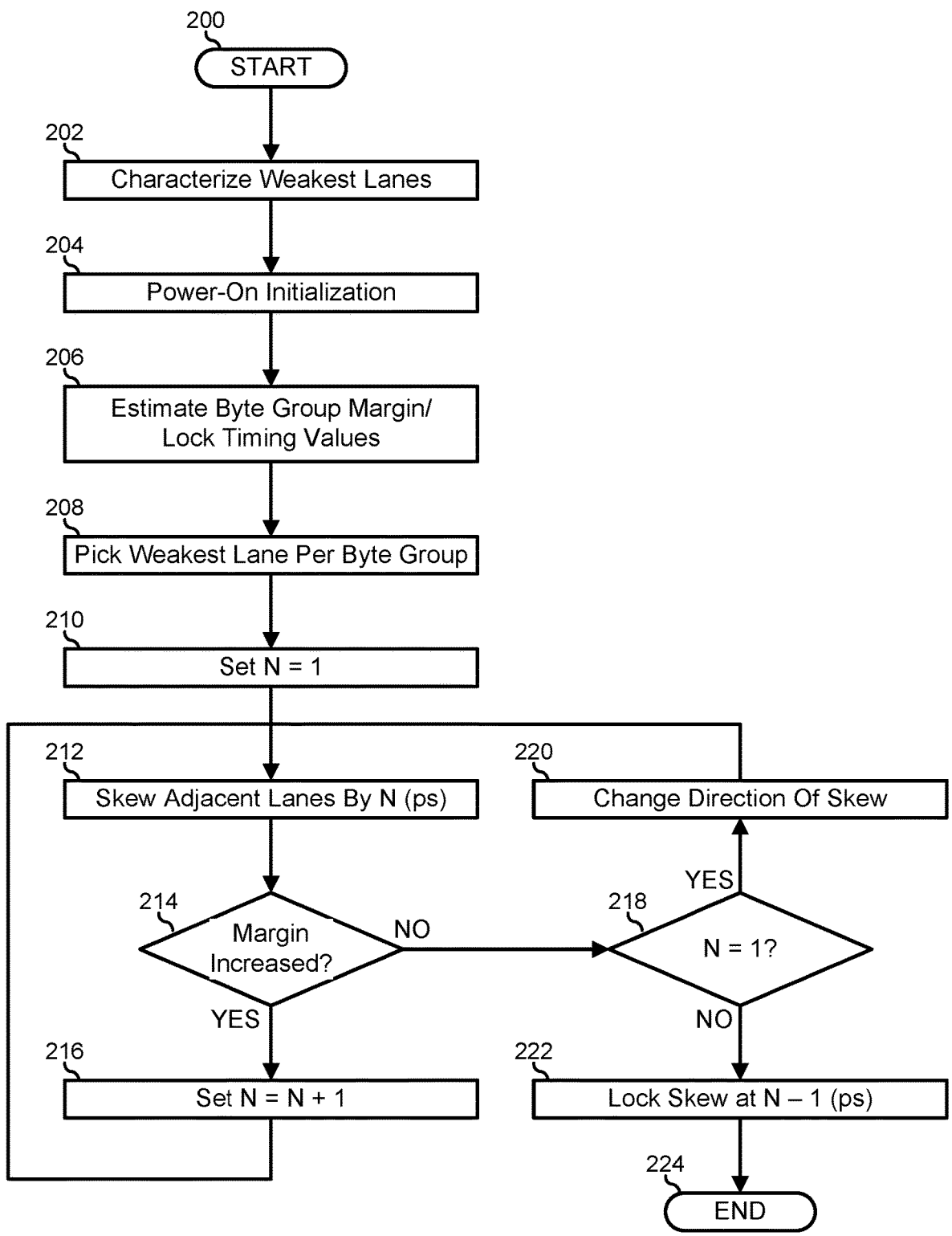
FIG. 2 is a flowchart illustrating a method for DDR5 crosstalk mitigation through aggressor misalignment according to an embodiment of the current disclosure.

FIG. 2 illustrates a method for DDR5 crosstalk mitigation through aggressor misalignment utilizing the worst case per bank group ranking information, starting at block 200. The susceptibility of the lanes in each byte group of a channel are characterized in block 202. Here, the information derived from the characterization can be stored to a non-volatile memory. The information handling system is powered on and the memory subsystem is initialized in block 204. The delay margins for each byte group are determined based upon the memory subsystem initialization and the values for the delays for each lane are locked in block 206. The lane that is most susceptible to crosstalk, that is, the weakest lane, is selected per byte group in block 208.

Hereinafter, the steps of the disclosed method will be understood to be performed individually for each byte group, but are described for a single byte group to simplify the disclosure. In block 210 a delay setting is set to one (1). The delay for the lanes that are adjacent to the lane selected in block 208 are skewed in a particular direction (i.e., a longer delay or a shorter delay) in block 212. The margin for the delay may be equal to the product of the delay setting and a predetermined delay step size (S), such that the delay (D) is given as D=N*S. The predetermined delay step size may be determined by architectural considerations for the memory subsystem. An example delay step size may include a 5 ps delay step, a longer delay step, or a shorter delay step, as needed or desired.

A decision is made as to whether or not the performance of the selected lane has improved in decision block 214. The determination as to whether or not the performance of the selected lane has improved as made in decision block 214 will be described further below. If the performance of the selected lane has improved, the "YES" branch of decision block 214 is taken, the delay counter is incremented such that $N_{new}=N_{old}+1$ in block 216, and the method returns to block 212 where the delay for the lanes that are adjacent to the selected lane are skewed further in the particular direction (i.e., a longer delay or a shorter delay). If the performance of the selected lane has not improved, the "NO" branch of decision block 214 is taken and a decision is made as to whether or not the delay counter is equal to one (1) in decision block 218.

Here, it will be understood that if the adjacent lanes were margined in a first direction in block 212, such as by lengthening the delay, with the first delay increment (i.e., D=1), and the performance of the selected lane has not improved, then the selected delay direction has not improved the performance. As such, when the delay counter is equal to one (1), the "YES" branch of decision block 218 is taken, the direction of the skew is reversed in block 220, and the method returns to block 212 where the delay for the lanes that are adjacent to the selected lane are skewed in the opposite direction (e.g., a shorter delay). If the delay counter is not equal to one (1), the "NO" branch of decision block 218 is taken, the skew is locked at $N_{new}=N_{old}-1$ in block 218, and the method ends in block 224. It will be understood that the method as described herein can be repeated after operating on the most susceptible lane. Here, on subsequent executions of the method, a next most susceptible lane can be margined in accordance with the method described above.

In a particular embodiment, the determination as to whether or not the performance of a target lane has improved is made based upon a design or manufacturing validation process wherein an instrumented interposer is added to the DIMM connector. Here a signal eye, including an eye height and an eye width, can be evaluated at each step to see if the margins of the signal eye have improved or worsened. In another embodiment, the determination is made based upon run time performance of the memory subsystem. For example, during an initialization phase, the number of times that the memory controller receives an ALERT signal from the DIMM may be correlated with a bit error rate (BER) experienced at the DIMM. Here, the improvement can be determined when the BER decreases, and the worsening can be determined by an increasing BER.

Figure 3:
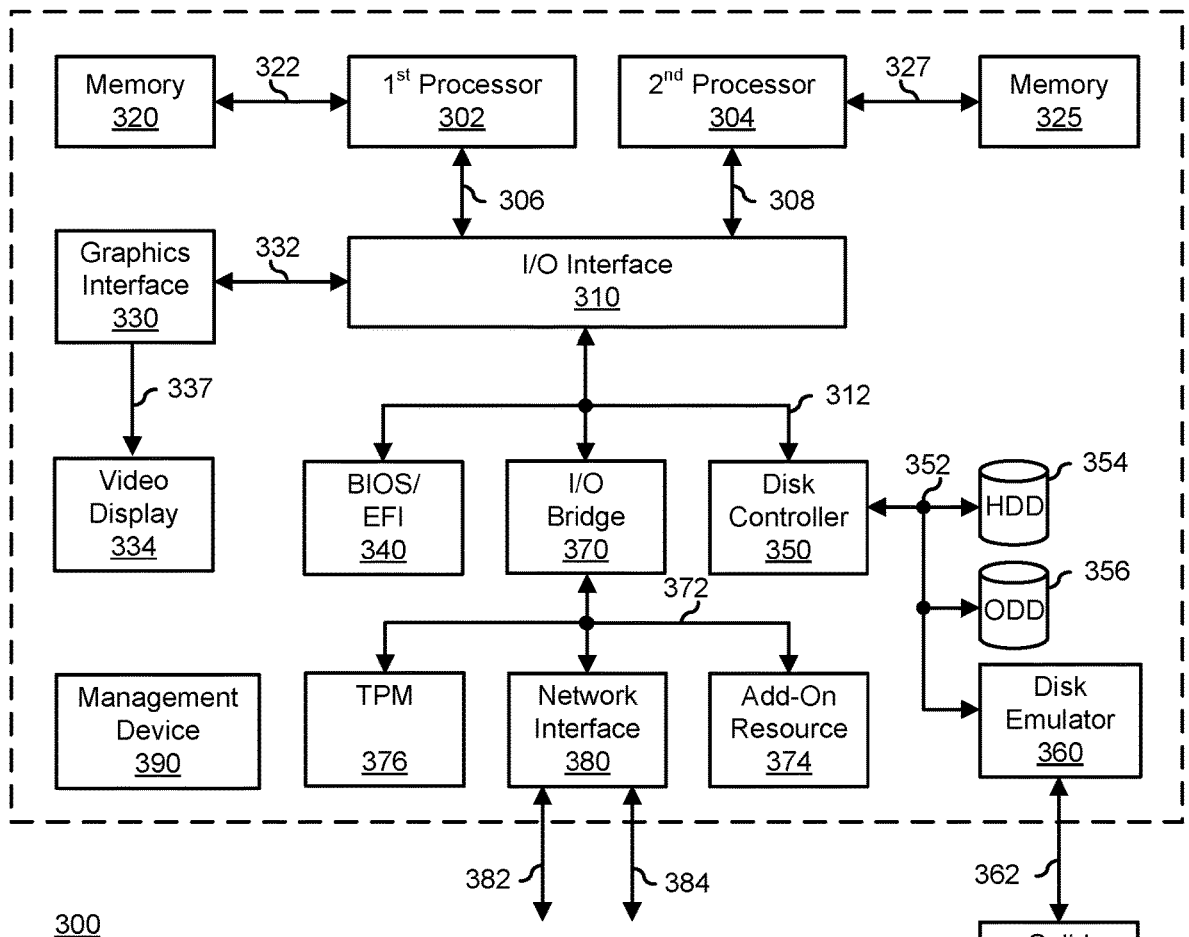
FIG. 3 is a block diagram illustrating a generalized information handling system according to another embodiment of the current disclosure.

FIG. 3 illustrates a generalized embodiment of an information handling system 300. For purpose of this disclosure an information handling system can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 300 can be a personal computer, a laptop computer, a smart phone, a tablet device or other consumer electronic device, a network server, a network storage device, a switch router or other network communication device, or any other suitable device and may vary in size, shape, performance, functionality, and price. Further, information handling system 300 can include processing resources for executing machine-executable code, such as a central processing unit (CPU), a programmable logic array (PLA), an embedded device such as a System-on-a-Chip (SoC), or other control logic hardware. Information handling system 300 can also include one or more computer-readable medium for storing machine-executable code, such as software or data. Additional components of information handling system 300 can include one or more storage devices that can store machine-executable code, one or more communications ports for communicating with external devices, and various input and output (I/O) devices, such as a keyboard, a mouse, and a video display. Information handling system 300 can also include one or more buses operable to transmit information between the various hardware components.

Information handling system 300 can include devices or modules that embody one or more of the devices or modules described below, and operates to perform one or more of the methods described below. Information handling system 300 includes a processors 302 and 304, an input/output (I/O) interface 310, memories 320 and 325, a graphics interface 330, a basic input and output system/universal extensible firmware interface (BIOS/UEFI) module 340, a disk controller 350, a hard disk drive (HDD) 354, an optical disk drive (ODD) 356, a disk emulator 360 connected to an external solid state drive (SSD) 362, an I/O bridge 370, one or more add-on resources 374, a trusted platform module (TPM) 376, a network interface 380, a management device 390, and a power supply 395. Processors 302 and 304, I/O interface 310, memory 320, graphics interface 330, BIOS/UEFI module 340, disk controller 350, HDD 354, ODD 356, disk emulator 360, SSD 362, I/O bridge 370, add-on resources 374, TPM 376, and network interface 380 operate together to provide a host environment of information handling system 300 that operates to provide the data processing functionality of the information handling system. The host environment operates to execute machine-executable code, including platform BIOS/UEFI code, device firmware, operating system code, applications, programs, and the like, to perform the data processing tasks associated with information handling system 300.

In the host environment, processor 302 is connected to I/O interface 310 via processor interface 306, and processor 304 is connected to the I/O interface via processor interface 308. Memory 320 is connected to processor 302 via a memory interface 322. Memory 325 is connected to processor 304 via a memory interface 327. Graphics interface 330 is connected to I/O interface 310 via a graphics interface 332, and provides a video display output 336 to a video display 334. In a particular embodiment, information handling system 300 includes separate memories that are dedicated to each of processors 302 and 304 via separate memory interfaces. An example of memories 320 and 330 include random access memory (RAM) such as static RAM (SRAM), dynamic RAM (DRAM), non-volatile RAM (NV-RAM), or the like, read only memory (ROM), another type of memory, or a combination thereof.

BIOS/UEFI module 340, disk controller 350, and I/O bridge 370 are connected to I/O interface 310 via an I/O channel 312. An example of I/O channel 312 includes a Peripheral Component Interconnect (PCI) interface, a PCI-Extended (PCI-X) interface, a high-speed PCI-Express (PCIe) interface, another industry standard or proprietary communication interface, or a combination thereof. I/O interface 310 can also include one or more other I/O interfaces, including an Industry Standard Architecture (ISA) interface, a Small Computer Serial Interface (SCSI) interface, an Inter-Integrated Circuit (I²C) interface, a System Packet Interface (SPI), a Universal Serial Bus (USB), another interface, or a combination thereof. BIOS/UEFI module 340 includes BIOS/UEFI code operable to detect resources within information handling system 300, to provide drivers for the resources, initialize the resources, and access the resources. BIOS/UEFI module 340 includes code that operates to detect resources within information handling system 300, to provide drivers for the resources, to initialize the resources, and to access the resources.

Disk controller 350 includes a disk interface 352 that connects the disk controller to HDD 354, to ODD 356, and to disk emulator 360. An example of disk interface 352 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 360 permits SSD 364 to be connected to information handling system 300 via an external interface 362. An example of external interface 362 includes a USB interface, an IEEE 1394 (Firewire) interface, a proprietary interface, or a combination thereof. Alternatively, solid-state drive 364 can be disposed within information handling system 300.

I/O bridge 370 includes a peripheral interface 372 that connects the I/O bridge to add-on resource 374, to TPM 376, and to network interface 380. Peripheral interface 372 can be the same type of interface as I/O channel 312, or can be a different type of interface. As such, I/O bridge 370 extends the capacity of I/O channel 312 when peripheral interface 372 and the I/O channel are of the same type, and the I/O bridge translates information from a format suitable to the I/O channel to a format suitable to the peripheral channel 372 when they are of a different type. Add-on resource 374 can include a data storage system, an additional graphics interface, a network interface card (NIC), a sound/video processing card, another add-on resource, or a combination thereof. Add-on resource 374 can be on a main circuit board, on separate circuit board or add-in card disposed within information handling system 300, a device that is external to the information handling system, or a combination thereof.

Network interface 380 represents a NIC disposed within information handling system 300, on a main circuit board of the information handling system, integrated onto another component such as I/O interface 310, in another suitable location, or a combination thereof. Network interface device 380 includes network channels 382 and 384 that provide interfaces to devices that are external to information handling system 300. In a particular embodiment, network channels 382 and 384 are of a different type than peripheral channel 372 and network interface 380 translates information from a format suitable to the peripheral channel to a format suitable to external devices. An example of network channels 382 and 384 includes InfiniBand channels, Fibre Channel channels, Gigabit Ethernet channels, proprietary channel architectures, or a combination thereof. Network channels 382 and 384 can be connected to external network resources (not illustrated). The network resource can include another information handling system, a data storage system, another network, a grid management system, another suitable resource, or a combination thereof.

Management device 390 represents one or more processing devices, such as a dedicated baseboard management controller (BMC) System-on-a-Chip (SoC) device, one or more associated memory devices, one or more network interface devices, a complex programmable logic device (CPLD), and the like, that operate together to provide the management environment for information handling system 300. In particular, management device 390 is connected to various components of the host environment via various internal communication interfaces, such as a Low Pin Count (LPC) interface, an Inter-Integrated-Circuit (I2C) interface, a PCIe interface, or the like, to provide an out-of-band (OOB) mechanism to retrieve information related to the operation of the host environment, to provide BIOS/UEFI or system firmware updates, to manage non-processing components of information handling system 300, such as system cooling fans and power supplies. Management device 390 can include a network connection to an external management system, and the management device can communicate with the management system to report status information for information handling system 300, to receive BIOS/UEFI or system firmware updates, or to perform other task for managing and controlling the operation of information handling system 300. Management device 390 can operate off of a separate power plane from the components of the host environment so that the management device receives power to manage information handling system 300 when the information handling system is otherwise shut down. An example of management device 390 include a commercially available BMC product or other device that operates in accordance with an Intelligent Platform Management Initiative (IPMI) specification, a Web Services Management (WSMan) interface, a Redfish Application Programming Interface (API), another Distributed Management Task Force (DMTF), or other management standard, and can include an Integrated Dell Remote Access Controller (iDRAC), an Embedded Controller (EC), or the like. Management device 390 may further include associated memory devices, logic devices, security devices, or the like, as needed or desired.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. An information handling system, comprising:
    a dual in-line memory module (DIMM); and
    a memory controller coupled to the DIMM via a data bus, the memory controller configured to:
        determine that a first lane of a byte group of the data bus is more susceptible to crosstalk than a second lane of the byte group;
        determine a first performance level of the first lane;
        change a delay (D) of a third lane of the byte group, the third lane being adjacent to the first lane, wherein, in changing the delay of the third lane, the memory controller is further configured to set a delay counter (N) equal to one (1), and wherein the delay (D) is given as $D=N*S$, where S is a preset step size of delay; and
        determine that a second performance level of the first lane is different from the first performance level in response to delaying the third lane.

2. The information handling system of claim 1, wherein, in response to determining that the second performance level is different from the first performance level, the memory controller is further configured to:
    determine that the second performance level is a better performance level than the first performance level; and
    change the delay (D) of the third lane of the byte group by incrementing the counter N in response to determining that the second performance level is the better performance level.

3. The information handling system of claim 2, wherein, in further response to determining that the second performance level is different from the first performance level, the memory controller is further configured to:
    determine that the second performance level is a worse performance level than the first performance level; and
    change the delay (D) of the third lane of the byte group in an opposite direction such that the delay (D) is give as $D=N*(-S)$.

4. The information handling system of claim 1, wherein in determining that the second performance level is different from the first performance level, the memory controller is further configured to:
    determine that a first signal eye of the first lane that is associated with the first performance level is different from a second signal eye of the first lane that is associated with the second performance level.

5. The information handling system of claim 1, wherein in determining that the second performance level is different from the first performance level, the memory controller is further configured to:
    determine that a first bit error rate (BER) of the first lane that is associated with the first performance level is different from a second BER of the first lane that is associated with the second performance level.

6. The information handling system of claim 5, wherein determining the first and second BERs is based upon an alert signal from the DIMM to the memory controller.

7. The information handling system of claim 1, further comprising:
    a non-volatile memory device configured to store a ranking of the lanes of the byte group, wherein the ranking indicates a susceptibility to crosstalk for the lanes of the byte group.

8. The information handling system of claim 7, wherein, in determining that the first lane of the byte group is more susceptible to crosstalk than the second lane of the byte group, the memory controller is further configured to:
    read the ranking from the non-volatile memory device.

9. The information handling system of claim 1, wherein the DIMM is a fifth generation double data rate (DDR5) DIMM.

10. A method, comprising:
    determining, by a memory controller coupled to a dual in-line memory module (DIMM) via a data bus, that a first lane of a byte group of the data bus is more susceptible to crosstalk than a second lane of the byte group;
    determining a first performance level of the first lane;
    changing a delay (D) of a third lane of the byte group, the third lane being adjacent to the first lane;
    setting a delay counter (N) equal to one (1), and wherein the delay (D) is given as $D=N*S$, where S is a preset step size of delay; and
    determining that a second performance level of the first lane is different from the first performance level in response to delaying the third lane.

11. The method of claim 10, wherein, in response to determining that the second performance level is different from the first performance level, the method further comprises:
    determining that the second performance level is a better performance level than the first performance level; and changing the delay (D) of the third lane of the byte group by incrementing the counter N in response to determining that the second performance level is the better performance level.

12. The method of claim 11, wherein, in further response to determining that the second performance level is different from the first performance level, the method further comprises:

determining that the second performance level is a worse performance level than the first performance level; and changing the delay (D) of the third lane of the byte group in an opposite direction such that the delay (D) is give as D=N*(−S).

13. The method of claim 10, wherein in determining that the second performance level is different from the first performance level, the method further comprises:

determining that a first signal eye of the first lane that is associated with the first performance level is different from a second signal eye of the first lane that is associated with the second performance level.

14. The method of claim 10, wherein in determining that the second performance level is different from the first performance level, the method further comprises:

determining that a first bit error rate (BER) of the first lane that is associated with the first performance level is different from a second BER of the first lane that is associated with the second performance level.

15. The method of claim 14, wherein determining the first and second BERs is based upon an alert signal from the DIMM to the memory controller.

16. The method of claim 10, further comprising:

storing, in a non-volatile memory device, a ranking of the lanes of the byte group, wherein the ranking indicates a susceptibility to crosstalk for the lanes of the byte group.

17. The method of claim 16, wherein, in determining that the first lane of the byte group is more susceptible to crosstalk than the second lane of the byte group, the method further comprises:

reading the ranking from the non-volatile memory device.

18. An information handling system, comprising:

a fifth generation double data rate (DDR5) dual in-line memory module (DIMM); and a DDR5 memory controller coupled to the DIMM via a data bus; and a non-volatile memory device configured to store a ranking of lanes of a byte group of the data bus, wherein the ranking indicates a susceptibility to crosstalk for the lanes of the byte group;

wherein the DDR5 memory controller is configured to:

determine that a first lane of a byte group of the data bus is more susceptible to crosstalk than a second lane of the byte group from the ranking;

determine a first performance level of the first lane;

change a delay of a third lane of the byte group, the third lane being adjacent to the first lane, wherein, in changing the delay of the third lane, the memory controller is further configured to set a delay counter (N) equal to one (1), and wherein the delay (D) is given as D=N*S, where S is a preset step size of delay; and determine that a second performance level of the first lane is different than the first performance level in response to delaying the third lane.

* * * * *